United States Patent [19]

Harrington

[11] 3,815,716

[45] June 11, 1974

[54] AUTOMATIC PISTON ADJUSTER
[75] Inventor: James A. Harrington, Morresville, Ind.
[73] Assignee: General Motors Corporation, Detroit, Mich.
[22] Filed: Mar. 19, 1973
[21] Appl. No.: 342,525

[52] U.S. Cl. .............................. 192/111 A, 188/71.8
[51] Int. Cl. ............................................. F16d 13/75
[58] Field of Search..... 192/111 A; 188/196 P, 71.8

[56] References Cited
UNITED STATES PATENTS

| 1,755,829 | 4/1930 | Loughead | 192/111 A |
| 2,536,269 | 1/1951 | Driscoll | 192/111 A |
| 3,502,180 | 3/1970 | Aiki et al | 188/196 P |
| 3,596,537 | 8/1971 | Koivunen | 74/759 |

*Primary Examiner*—Benjamin W. Wyche
*Attorney, Agent, or Firm*—A. M. Heiter

[57] ABSTRACT

A transmission having a fluid pressure piston and cylinder actuator for engaging a friction device for engaging a drive having return springs positioned between a retainer plate which is fixed on the cylinder housing and the piston which reciprocates in the cylinder. Posts on the piston extend through the retainer and one-way spring friction fasteners positioned on the posts retain the retainer plate and piston in released position with the springs compressed between the retainer plate and the piston as a preassembled subassembly, which is secured in released position by securing the retainer plate to the cylinder housing. The retainer plate has ears limiting movement of the fastener to the initial brake apply movement distance and operative after friction plate wear increases apply movement to slide the fastener on the post to limit return movement to maintain a constant running clearance distance in the disengaged position and a constant apply distance from the disengaged position to the engaged position to maintain constant friction device apply timing relative to the application of apply pressure for constant shift timing during the life of the transmission.

10 Claims, 3 Drawing Figures

PATENTED JUN 11 1974

3,815,716

AUTOMATIC PISTON ADJUSTER

This invention relates to transmissions and particularly friction device actuators for engaging a drive.

BACKGROUND OF THE INVENTION

This invention relates to, and is an improvement over, U.S. Pat. No. 3,596,537, Erkki A. Koivunen, patented Aug. 3, 1971, entitled "Clutch Piston and Retraction Spring Subassembly and Method of Transmission Assembly" which shows and is incorporated by reference for the background disclosure of the transmission having a drive engaging friction device actuator with a fastening device securing the retainer plate, return springs and piston together as a preassembled subassembly.

BRIEF DESCRIPTION OF THE INVENTION

In transmissions having a fluid actuator for engaging a friction device for transmitting reaction or drive torque for establishing a transmission drive the fluid actuators have a piston reciprocating in a cylinder and return springs located between a retainer member fixed relative to the cylinder and the piston to return the piston to the released position on release of the fluid pressure employed to move the piston to the engaged position. A fastener device secures the piston and retainer together with the return springs compressed therebetween as a secured preassembled subassembly for final assembly of the subassembly in the cylinder by securing the retainer member on the cylinder against movement by the return springs. In the subassembly and final assembly, the piston and retainer member are located in the proper relative position for release with new or unworn clutch plates. The fastener device retains its original position relative to the piston and moves freely away from the retainer as the piston moves through the normal clearance or apply travel distance from the released to the engaged position for the friction device in new or unworn condition. After wear occurs in the friction device, the piston moves further through a larger clearance or apply travel distance, increased by wear, to engage the friction device and moves the fastener device by an amount to compensate for wear to limit return movement on a subsequent release to the original clearance to apply travel distance. Thus on successive friction device engagements during the life of the transmission, the travel distance is the same as the fastener device functions as a slack or clearance adjuster and the engagement time relative to control valve operation is the same.

The subassembly securing and slack adjusting fastener device consists of one or more posts fixed on the piston. Each post extends through an opening in the retainer plate, a one-way spring friction fastener is pushed on the post to engage and hold the retainer member with the return springs compressed between the retainer member and piston in the released position for a new or unworn friction device as a secured preassembled subassembly. The subassembly is held in the cylinder in released position by securing the retainer member to the cylinder. The retainer plate has a plurality of stop ears axially spaced from the retainer plate with the friction fastener therebetween permitting free movement of the friction fastener as it moves with the post on the piston from released to engaged position for a new friction device and sliding the friction fastener on the post when as a result of friction device wear the piston travels further to the apply position. Thus, on subsequent return movement, a worn released position is established by the friction fastener engaging the retainer member to establish a worn released position the same clearance distance from the worn engaged position. Thus a simple post, one-way friction fastener and friction fastener movement limiting stop ears on the retainer member provide both subassembly securing and constant clearance adjustment functions. The limit stop ears are struck or stamped from the retainer member so no additional parts are required to obtain both the subassembly and the clearance adjustment function.

BRIEF DESCRIPTION OF THE DRAWINGS

These and other features are shown in the following detailed description of the preferred embodiment described below and shown in the following drawings.

DETAILED DESCRIPTION

Figure 1:
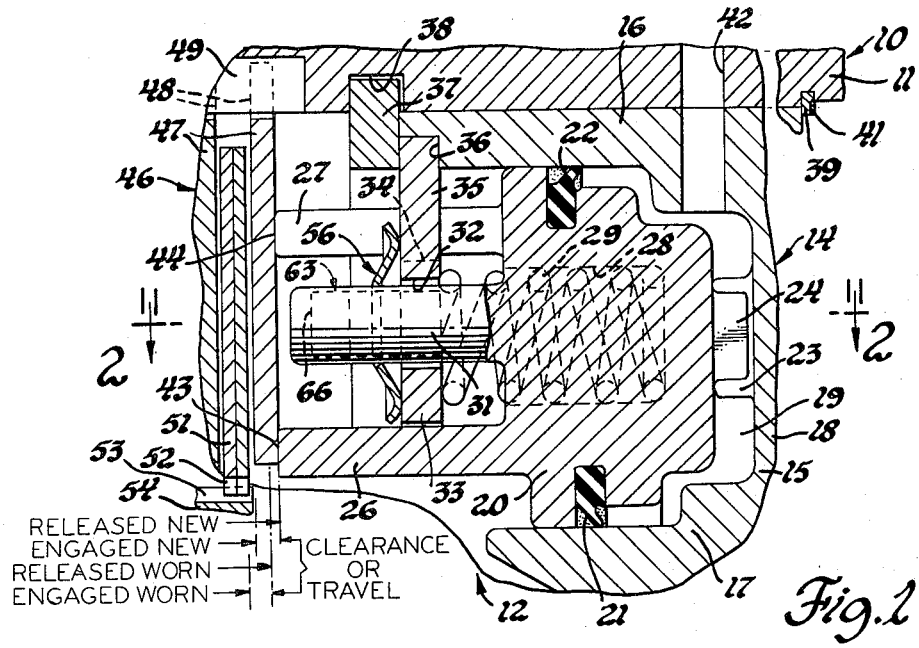
FIG. 1 is a partial section of a transmission having a fluid actuator for actuating a friction drive device.

Referring to the drawing, transmission 10 located in housing 11 is constructed in accordance with the above U.S. Pat. No. 3,596,537 with the second and third speed fluid actuated friction ratio drive establishing devices modified as shown by the third speed friction drive establishing device 12. The fluid actuator 14 has an annular cylinder 15 having annular outer wall 16 and inner wall or base portion 18 connected by base portion 18 defining the chamber 19 between the cylinder and piston 20 which is reciprocably mounted in the cylinder. Inner and outer seals 21 and 22 respectively seal the piston to the inner and outer cylinder walls sealing chamber 19. Abutment member 23 on the cylinder end wall or base portion 18 and abutment member 24 on the piston cooperate to prevent rotary motion of the piston relative to the cylinder but permit axial reciprocating movement. The piston has, projecting away from the cylinder, projecting actuator apply face means formed by the inner projecting actuator face portion 26 and the outer projecting actuator face portion 27 of piston 20. The actuator face portion 27 as explained below, is interrupted or has gaps therein, so that the retainer ears of the retainer plate may extend through the gaps. The piston 20 has an annular series of spring seat pockets 28 to receive and provide a seat for the return springs 29 which are arranged in an annular series centrally of the piston and between the projecting actuator faces. The piston also has several round posts 31 located between the springs in the same annular formation. The posts extend through apertures 32 in the retainer plate 33 whose inner diameter terminates in clearance relationship to projecting face portion 26 and outer diameter has gaps 34 at the interrupted projecting face portion 27 and ear portions 35 extending through the gaps in the interrupted face portion and fitting in a recess 36 in the outer wall of the cylinder. The snap ring 37 fits in the recess 38 in the housing 11 to secure the cylinder member 15 and retainer plate 33 in the housing. The other end of the cylinder of the fluid actuated ratio friction engaging device is positioned relative to the housing by snap ring 39 located in recess 41 in housing 11.

Figure 2:
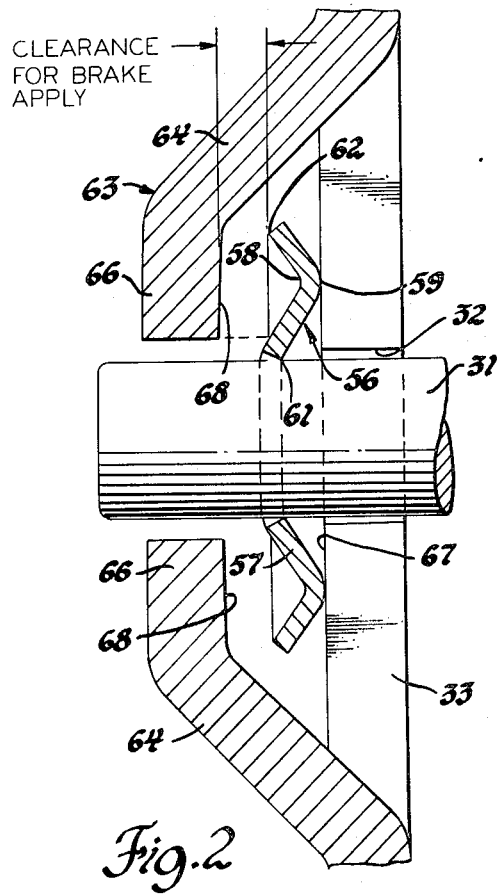
FIG. 2 is a partial section on the line 2—2 of FIG. 1.
Figure 3:
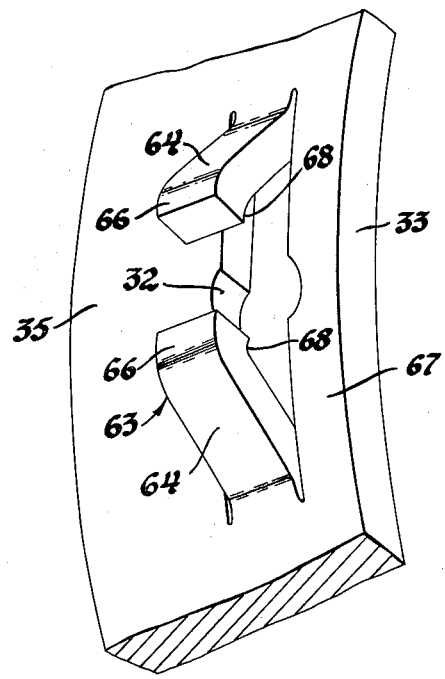
FIG. 3 is a partial perspective view of the retainer member and limit stop ears.

It will be appreciated that a single actuator shown in FIG. 1 or a double actuator as shown in U.S. Pat. No. 3,596,537, may be positioned between these snap rings. A suitable transmission control system, not shown, selectively provides fluid pressure through the passage 42 to the chamber 19 between the piston and cylinder to actuate the piston so that the projecting apply face portions or members 26 and 27 having respectively apply faces 43 and 44 to engage the friction drive establishing device 46 which is illustrated as a friction torque reaction device for establishing a transmission drive and consists of a plurality of alternate plates 47 having external splines 48 meshing with the internal spline 49 in housing 11 to nonrotatably secure these plates to the housing. The intermediate plates 51 have internal splines 52 connected by splines 53 to the reaction drum 54 suitably connected to the gearing as shown in the above U.S. Pat. No. 3,596,537. It will be appreciated that the friction drive establishing device 46 has first and second torque transmitting drums or means 54 and housing 11 of drum shape which grounds the reaction torque of drum 54 and friction plate means 47–51 transmitting reaction torque for establishing a drive. The actuator may also be used in a friction drive establishing device as clutch 40 of U.S. Pat. No. 3,596,537 which transmits drive torque between torque transmitting drums or means. A one-way spring friction fastener 56 is pushed over each post and grips the post to secure itself to the post in response to any movement away from the piston caused by the return springs 29 acting on retainer plate 33 but will slip further on the post in the opposite direction in response to a moderate force. The friction fastener 56 is an annular member having an inner conical portion 57 and an outer conical portion 58 joined in an annular apex 59 and as shown in detail in FIG. 2, all radial sections have the same wide V-shape. The inner perimeter has a sharp inner edge 61 at the junction with the lower surface engaging the post 31 with light gripping action in the free state to retain and hold the fastener in a fixed position on the post unless moved by an operating force. The light gripping action is also sufficient to cause the cone portion 57 to flatten due to return spring force transferred by the retainer plate 33 to the apex 59 of the fastener 56 so the fastener tightly grips the post to hold or secure the fastener against the full return spring force. The outer conical portion 58 stiffens the inner conical portion and has at the outer perimeter of the fastener a releasing abutment edge 62. The retainer plate has on each side of aperture 32 in an annular direction, a pair of limit stop ears 63, formed by slitting and striking from the retainer plate material, functioning to limit the movement of the friction fastener relative to the retainer plate. The ears 63 have a diagonal portion 64 to space the parallel portion 66 from the flat retainer plate 33, so that the distance between the facing surfaces 67 on the retainer plate and 68 on the ear permit movement of the fastener 56 through the normal apply travel distance which is preferably the full clearance distance required for full brake apply with some allowance for tolerance variations and may include a small additional distance permitting a small amount of wear before there is a slack adjustment to reduce the frequency of slack adjustment. Such small additional distance is sufficiently small so the variation of apply travel distance, and thus the variation of engagement time of the friction drive device 12, is insignificant. The fluid actuator is assembled by placing the springs 29 in the spring pockets 28 and placing the retainer plate 33 with the fasteners between the retainer plate and stop ears and aligned with the openings over the posts 31 and moving the retainer plate 33 with the fasteners on the posts to the proper retraction position compressing springs 29 and positioning fasteners 56 on the posts to secure the piston, retainer plate together with the springs compressed therebetween in the retracted position into the secured preassembled subassembly. Since the one-way fasteners in the free state lightly grip the posts they readily slide on the posts toward the cylinder with a light hand assembly force. The subassembly is positioned in the cylinder. It will be appreciated that the subassembly may be made in a separate fixture or in the cylinder. The cylinder and piston subassembly is then positioned within the transmission housing 11 against snap ring 39 and a proper thickness snap ring 37 selected to accommodate for tolerance variations is inserted in the recess 38 to secure this cylinder in the housing 11 and to secure the retainer plate 33 in the groove 36 without axial movement. Thus the retainer plate is secured against relative movement to the cylinder housing structure, the cylinder and housing, and particularly resists any movement of the retainer plate by the return springs relative to this cylinder housing structure. The brake plates 46 are then positioned so that a stationary plate 47 contacts the projecting faces 26, 27 of the piston so that rotary movement of the friction device is not transmitted to the piston. Nevertheless, to insure nonrotation of the piston, rotary movement stops 23, 24 are also provided. These stops or stop shoulders may also stop the piston in the retracted position.

The piston 20 is shown in the initially assembled retracted position to which it is biased by the springs 29 reacting on the retainer plate 33 as limited by the fastener 56. In this position it is preferably that snap ring 37 exert a small pressure on the retainer plate, relieving a little force on the fastener 56 so the piston engages the stop members 23, 24 or stop shoulders but it will be appreciated that this is not necessary and the fastener may hold the full return spring force and the piston be slightly axially spaced from the cylinder. In this initially assembled retracted position the annular apex 59 of the fastener 56 engages the surface 67 of the retainer plate so the fasteners more tightly grip the post holding the piston in the retracted position. Thus force at the apex, a grip intensifying point, tightens the grip. This original or new clutch released position "released new" of the piston is shown in conjunction with the released position of the plates of brake 46. There is clearance between relatively rotating plates 47, 51 but not between apply face 43, 44 and adjacent plate 47 as there is no relative rotation. On the supply of operating fluid, via passage 42 to chamber 19, to move the piston 20 from the released new position shown through the clearance or travel distance to the "engaged new" position, the friction device is engaged when the plates are new or in unworn condition. On such apply movement the friction device 56 remains fixed in the same position on posts 31 and merely moves through the clearance or brake apply distance between the surface 67 on the retainer plate and the surface 68 on the ears. As the brake plates wear and become slightly thinner in small increments, the clearance or travel distance, will be slightly longer and the posts 31 will move the fasteners 56 a slightly longer distance, so that the fastener outer perimeter edge 62 first engages the inner surface 68 of ear 63 to flex the fastener 56 to partially release the fastener grip to a light grip on the post 31 at the inner perimeter 61 of the fastener so that when the ear surface 68 engages the portion 57 of the fastener, it easily slides the fastener on the post a short distance to compensate for each small increment of wear. Thus the outer perimeter 62 is a grip de-intensifying or partial releasing portion. Then on release of the friction device by exhausting fluid from cavity 19 through pipe 42, the piston returns to a released worn position for the increment of wear which is slightly advanced as compared to the released position for new plates by the increment of wear. These incremental changes for wear are very small, on the order of a few thousandths of an inch, and maintain the same clearance or travel distance for the piston during the life of the transmission, so that the time for engaging the friction device in response to the supply of fluid pressure by a control system to the actuator remains constant during the life of the transmission. These small increments of wear provide incremental released worn and engaged worn positions which accumulate over a long period of time in which brake plates will become considerably worn and such "released worn" and "engaged worn" positions are illustrated in FIG. 1 to show that the travel distance is the same when the plates are new and when worn or during the life of the friction drive device.

It will be appreciated that the invention not only includes the above described preferred embodiments but other equivalents thereof.

It is claimed:

1. In a transmission; drive means having a first and a second torque transmitting means; friction plate drive establishing means operably connecting said torque transmitting means having apply face means axially movable from a released position through a clearance travel distance to an engaged position to transmit operating torque between said first and second torque transmitting means; one of said torque transmitting means including a cylinder; a preassembled secured subassembly including a piston member supporting said apply face means for engaging said drive establishing means, a retainer member positioned adjacent the outer side of said piston, return springs seated and compressed between said piston and retainer members and one-way friction fastener means having a portion on one member and a fastener portion on the other member relatively slidable and interengaging to hold any relative positions between the members in the absence of a moving force, to permit relative movement of said fastener portion following movement of said retainer member toward said piston member in response to light force and to prevent relative movement of said portions when said springs bias said retainer member away from said piston member, initially positioned to secure said subassembly together and hold said springs compressed substantially in the released position of said piston member relative to said retainer member; said subassembly being positioned in said cylinder with said outer side of said piston member facing said drive establishing means, said retainer member being secured to said one torque transmitting means to position said piston member and said apply face means in released position; stop means on one of said members to limit relative movement of a portion of said friction fastener means and said one member to said clearance travel distance as the piston member moves from said released to engaged position and operative as said friction plate drive establishing means wears requiring a further increment of movement from the released to the engaged position to move said portion of said friction fastener means a distance equal to the further increment of movement to limit return movement to said clearance travel distance for uniform timed engagement during the life of said friction drive means.

2. In a transmission; drive means having a first and a second torque transmitting means; friction plate drive establishing means operably connecting said torque transmitting means having apply face means axially movable from a released position through a clearance travel distance to an engaged position to transmit operating torque between said first and second torque transmitting means; one of said torque transmitting means including a cylinder; a preassembled secured subassembly including a piston supporting said apply face means for engaging said drive establishing means and fastener receiving means on the outer side of said piston, a retainer positioned adjacent the outer side of said piston, return springs seated and compressed between said piston and retainer and one-way friction fastener means slidable engaging said fastener receiving means to hold any relative position in the absence of a moving force, to permit movement of said friction fastener means toward said piston in response to a light force and to prevent movement away from said piston in response to the heavy return spring force, initially positioned to engage said retainer to secure said subassembly together and hold said springs compressed substantially in the released position of said piston relative to said retainer; said subassembly being positioned in said cylinder with said outer side of said piston facing said drive establishing means, said retainer being secured to said one torque transmitting means to position said piston and said apply face means in released position; stop means on said retainer to limit movement of said friction fastener means away from said retainer to said clearance travel distance as the piston moves from said released to engaged position and operative as said friction plate drive establishing means wears requiring a further increment of movement from the released to the engaged position to move said friction fastener on said post toward said piston a distance equal to the further increment of movement of limit return movement to said clearance travel distance for uniform timed engagement during the life of said friction drive means.

3. In a transmission; drive means having a first and a second torque transmitting means; friction plate drive establishing means operably connecting said torque transmitting means having apply face means axially movable from a released position through a clearance travel distance to an engaged position to transmit operating torque between said first and second torque transmitting means; one of said torque transmitting means including a cylinder; a preassembled secured subassembly including a piston supporting said apply face means for engaging said drive establishing means and a fastener post on the outer side of said piston, a retainer having openings positioned on said piston with the fastener posts extending through said openings, return springs seated and compressed between said piston and retainer and one-way friction fasteners slidable on said posts against said retainer to secure said preassembled subassembly together and hold said springs compressed substantially in the released position of said piston relative to said retainer; said subassembly being positioned in said cylinder with said outer side of said piston facing said drive establishing means, said retainer being secured to said one torque transmitting means to position said piston and its apply face means in released position; stop means on said retainer to limit movement of said friction fastener away from said retainer to said clearance travel distance as the piston moves from said released to engaged position and operative as said friction plate drive establishing means wears requiring a further increment of movement from the released to the engaged position to move said friction fastener on said post toward said piston a distance equal to the further increment of movement to limit return movement to said clearance travel distance for uniform timed engagement during the life of said friction drive means.

4. In a transmission; drive means having a first and a second torque transmitting means; friction plate drive establishing means operably connecting said torque transmitting means having apply face means axially movable from a released position through a clearance travel distance to an engaged position to transmit operating torque between said first and second torque transmitting means; one of said torque transmitting means including a cylinder; a preassembled secured subassembly including a piston supporting said apply face means for engaging said drive establishing means and a fastener post on the outer side of said piston, a retainer having openings positioned on said piston with the fastener posts extending through said openings, return springs seated and compressed between said piston and retainer and one-way friction fasteners slidable on said posts toward said piston in response to a light force and gripping said post sufficiently to prevent relative movement in the absence of a moving force and having grip intensifying point positioned against said retainer plate so the spring force tightens the fastener grip on the post and secures said preassembled subassembly together and holds said springs compressed substantially in the released position of said piston relative to said retainer; said subassembly being positioned in said cylinder wtih said outer side of said piston facing said drive establishing means, said retainer being secured to said one torque transmitting means to position said piston and said apply face means in released position; stop means on said retainer to limit movement of said friction fastener away from said retainer to said clearance travel distance as the piston moves from said released to engaged position; said friction fastener having a grip releasing portion and a fastener moving portion cooperating with said stop means and operative as said friction plate drive establishing means wears requiring a further increment of movement from the released to the engaged position to initially engage said grip releasing portion to release said friction fastener and then to engage said moving portion to move said friction fastener on said post toward said piston a distance equal to the further increment of movement to limit return movement to said clearance travel distance for uniform timed engagement during the life of said friction drive means.

5. In a transmission; drive means having a first and a second torque transmitting means; friction drive means operably connecting said first and second torque transmitting means having plate means operably connected to said first and second torque transmitting means and including an apply plate rotatably fixed to said second torque transmitting means and axially movable from a released position through a clearance travel distance to an engaged position to transmit operating torque between said first and second torque transmitting means; said second torque transmitting means including a cylinder; a preassembled secured subassembly including a piston having an apply face for engaging said apply plate and fastener posts on the outer side of said piston, a retainer plate having openings positioned on said piston with the fastener posts extending through said openings, return springs seated and compressed between said piston and retainer plate and one-way friction fasteners slidable on said posts against said retainer plate to secure said preassembled subassembly together and hold said springs compressed substantially in the released position of said piston relative to said retainer plate; said subassembly being positioned in said cylinder with said outer side of said piston facing said plate means, said retainer plate being secured to said second torque transmitting means to position said piston and its apply face in released position so said apply plate is in released position releasing said plate means; stop means on said retainer plate to limit movement of said friction fastener away from said retainer means to said clearance travel distance as the piston moves from said released to engaged position and operative as said friction plate means wears requiring a further increment of movement of the apply plate from the released to the engaged position to move said friction fastener on said post toward said piston a distance equal to the further increment of movement to limit return movement to said clearance travel distance during the life of said friction drive means for uniform timed engagement during the life of the transmission.

6. The invention defined in claim 5 and said stop means being a pair of ears formed by slitting and displacing a portion of said retainer plate contiguous with said opening so the facing ear and retainer plate surfaces are spaced apart by said clearance travel distance.

7. The invention defined in claim 5 and said one-way friction fastener being an annular resilient member having a central hole providing an inner rim around said hole having a sharp gripping edge and an adjacent sliding portion and an outer rim having a release abutment portion and between said inner and outer rims a wide V radial section having inner and outer conical portions connected at an apex facing said retainer plate and operative on relative movement on said post with the apex side toward said retainer plate to flex said friction fastener for sliding movement over said post to engage said retainer plate, on said retainer plate engaging said apex flexing said friction fastener so said gripping edge more tightly grips said post to hold said return springs compressed and on apply movement of said post relative to said retainer plate to move said friction fastener away from said retainer plate to cause said release abutment portion to initially engaging said stop means to flex said friction fastener to reduce the gripping and then to engaging said sliding portion to slide said friction fastener relative to said post a distance equal to an increment of movement.

8. In a transmission; drive means having a first and a second torque transmitting means; friction drive means operably connecting said first and second torque transmitting means having friction plate means operably connected to said first and second torque transmitting means and including an apply plate rotatably fixed to said second torque transmitting means and axially movable from a released position through a clearance travel distance to an engaged position to transmit operating torque between said first and second torque transmitting means; said second torque transmitting means including a cylinder; a preassembled secured subassembly including a piston having an apply face for engaging said apply plate and fastener posts on the outer side of said piston, a retainer having openings, return springs seated between said piston and retainer, a one-way friction fastener positioned over each opening on the side of the retainer remote from said piston and slidable on each post toward said piston and gripping against movement in the opposite direction, stop means on said remote side of said retainer limiting movement of said friction fasteners away from said retainer to said clearance travel distance, said retainer being positioned with said posts extending through said openings and friction fasteners and said friction fasteners gripping said posts to hold said retainer compressing said springs in the initial released position relative to said piston as a secured preassembled subassembly; said subassembly being positioned in said cylinder with said outer side of said piston facing said friction plate means, said retainer being secured to said second torque transmitting means to position said piston and its apply face in said initial released position so said apply plate is in released position releasing said friction plate means; said stop means permitting piston movement through said clearance travel distance to engage said friction plate means before significant wear occurs without moving said friction fasteners on said posts and operative as said friction plate means wears requiring a further increment of movement of said piston from the released to the engaged position to move said friction fasteners on said posts toward said piston a distance equal to the further increment of movement to limit return movement to said clearance travel distance for uniform timed engagement during the life of said friction drive means.

9. The invention defined in claim 8 and said stop means being a pair of ears formed by slitting and displacing a portion of said retainer plate contiguous with said opening so the facing ear and retainer plate surfaces are spaced apart by said clearance travel distance.

10. The invention defined in claim 8 and said one-way friction fastener being an annular resilient member having a central hole providing an inner rim around said hole having a sharp gripping edge and an adjacent sliding portion and an outer rim having a release abutment portion and between said inner and outer rims a wide V radial section having inner and outer conical portions connected at an apex facing said retainer plate and operative on relative movement on said post with the apex side toward said retainer plate to flex said friction fastener for sliding movement over said post to engage said retainer plate, on said retainer plate engaging said apex flexing said friction fastener so said gripping edge more tightly grips said post to hold said return springs compressed and on apply movement of said post relative to said retainer plate to move said friction fastener away from said retainer plate to cause said release abutment portion to initially engaging said stop means to flex said friction fastener to reduce the gripping and then to engaging said sliding portion to slide said friction fastener relative to said post a distance equal to an increment of movement.

* * * * *

UNITED STATES PATENT OFFICE
CERTIFICATE OF CORRECTION

Patent No. 3,815,716     Dated June 11, 1974

Inventor(s) James A. Harrington

It is certified that error appears in the above-identified patent and that said Letters Patent are hereby corrected as shown below:

Column 1, line 47, "to" should read -- or --. Column 2, line 34, "or base portion 18" should read -- 17 --. Column 4, line 39, "preferably" should read -- preferable --. Column 6, claim 2, line 48, "of", second occurrence, should read -- to --.

Signed and sealed this 24th day of September 1974.

(SEAL)
Attest:

McCOY M. GIBSON JR.
Attesting Officer

C. MARSHALL DANN
Commissioner of Patents